United States Patent
Brandenstein et al.

(10) Patent No.: US 11,370,306 B2
(45) Date of Patent: Jun. 28, 2022

(54) ELECTRICALLY DRIVEN UNDERGROUND VEHICLE, IN PARTICULAR A MOBILE LOADER

(71) Applicant: GHH FAHRZEUGE GMBH, Gelsenkirchen (DE)

(72) Inventors: Dirk Brandenstein, Willich (DE); Thomas Deimel, Müllheim/Ruhr (DE)

(73) Assignee: GHH FAHRZEUGE GMBH, Gelsenkirchen (DE)

( * ) Notice: Subject to any disclaimer, the term of this patent is extended or adjusted under 35 U.S.C. 154(b) by 270 days.

(21) Appl. No.: 16/493,837

(22) PCT Filed: Mar. 26, 2018

(86) PCT No.: PCT/EP2018/057636
§ 371 (c)(1),
(2) Date: Mar. 16, 2020

(87) PCT Pub. No.: WO2018/178009
PCT Pub. Date: Oct. 4, 2018

(65) Prior Publication Data
US 2020/0207217 A1    Jul. 2, 2020

(30) Foreign Application Priority Data

Mar. 28, 2017    (DE) ...................... 10 2017 106 619.5

(51) Int. Cl.
*B60L 9/00*        (2019.01)
*B60L 7/18*        (2006.01)
(Continued)

(52) U.S. Cl.
CPC .................................. *B60L 7/18* (2013.01);
*B60K 1/02* (2013.01); *B60K 1/04* (2013.01);
*B60L 50/50* (2019.02);
(Continued)

(58) Field of Classification Search
CPC ... B60K 1/02; B60K 1/04; B60K 1/00; B60K 2001/001; B60K 2001/0416; B60P 1/00;
(Continued)

(56) References Cited

U.S. PATENT DOCUMENTS 7,053,568 B2 * 5/2006 Rudinec .................. B60L 1/003
                                                318/139
8,536,814 B2 * 9/2013 Mazumdar ................ H02P 5/74
                                                318/440
(Continued)

FOREIGN PATENT DOCUMENTS

EP         2578436 A1    4/2013
WO      2011080392 A1    7/2011

OTHER PUBLICATIONS

International Search Report dated Jul. 3, 2018 re: Application No. PCT/EP2018/057636; pp. 1-3, citing: US 20120298004 A1, US 20110175579 A1, EP 2519420 A1, EP 2578436 A1 and US 20050235865 A1.

*Primary Examiner* — James M Dolak
(74) *Attorney, Agent, or Firm* — Cantor Colburn LLP

(57) ABSTRACT

An electrically driven, movable underground vehicle and a method for operating the same, includes a chassis with at least two driven drive wheels, an electrical trailing cable for connection to an electrical supply network, an electric drive motor, which is electrically connected to the trailing cable, for driving the drive wheels, and an energy storage unit. The vehicle further includes an auxiliary drive motor with a subsequent hydraulic fluid transmission, a switchgear assembly and a processor for controlling the supply of the electric drive motor and the electric auxiliary drive motor with electrical energy. The drive motor directly drives the drive wheels while bypassing the hydraulic fluid transmission. Also, the energy provided by the energy storage unit is
(Continued)

sufficient for driving the drive wheels and for temporarily moving the load-haul-dump machine independently of the supply network.

6 Claims, 2 Drawing Sheets

(51) Int. Cl.
| | |
|---|---|
| *B60L 50/50* | (2019.01) |
| *B60L 58/12* | (2019.01) |
| *B60L 50/60* | (2019.01) |
| *B60L 50/53* | (2019.01) |
| *B60K 1/02* | (2006.01) |
| *B60K 1/04* | (2019.01) |
| *B60P 1/00* | (2006.01) |

(52) U.S. Cl.
CPC ............ *B60L 50/53* (2019.02); *B60L 50/66* (2019.02); *B60L 58/12* (2019.02); *B60P 1/00* (2013.01); *B60L 2200/40* (2013.01)

(58) Field of Classification Search
CPC ...... B60L 7/00; B60L 7/18; B60L 7/26; B60L 7/08; B60L 7/10; B60L 7/02; B60L 7/04; B60L 7/12; B60L 7/22; B60L 50/66; B60L 50/53; B60L 50/50; B60L 50/00; B60L 50/60; B60L 58/12; B60L 58/25; B60L 58/00; B60L 58/10; B60L 2200/40; B60L 2240/545; B60L 2240/547; B60L 2260/26; B60L 1/00; B60L 1/003
See application file for complete search history.

(56) References Cited

U.S. PATENT DOCUMENTS

| | | | | |
|---|---|---|---|---|
| 8,550,008 | B2* | 10/2013 | Mazumdar | B60L 7/10 |
| | | | | 104/289 |
| 8,610,382 | B2* | 12/2013 | Goldammer | B60L 1/003 |
| | | | | 318/139 |
| 8,660,760 | B2* | 2/2014 | Piipponen | B60K 6/00 |
| | | | | 701/50 |
| 8,698,437 | B2* | 4/2014 | Mazumdar | H02P 5/74 |
| | | | | 318/442 |
| 8,702,560 | B2* | 4/2014 | Ohno | B60W 30/18127 |
| | | | | 477/5 |
| 8,955,657 | B2* | 2/2015 | Osara | B60L 53/20 |
| | | | | 191/3 |
| 9,170,081 | B2* | 10/2015 | Rudinec | B60L 1/003 |
| 9,272,677 | B2* | 3/2016 | Mazumdar | B60L 50/40 |
| 9,481,250 | B2* | 11/2016 | Osara | B60L 5/005 |
| 9,580,966 | B2* | 2/2017 | Rudinec | E21B 7/025 |
| 9,764,634 | B2* | 9/2017 | Dorsett | B60L 50/60 |
| 10,086,707 | B2* | 10/2018 | Kouvo | B60L 50/53 |
| 10,889,184 | B2* | 1/2021 | Petrenec | B62D 11/183 |
| 11,192,452 | B2* | 12/2021 | Satterthwaite | B60L 7/18 |
| 2005/0235865 | A1 | 10/2005 | Kumar | |
| 2011/0175579 | A1 | 7/2011 | Mazumdar | |
| 2012/0298004 | A1 | 11/2012 | Osara et al. | |

* cited by examiner

ELECTRICALLY DRIVEN UNDERGROUND VEHICLE, IN PARTICULAR A MOBILE LOADER

TECHNICAL FIELD

The disclosure relates to an electrically driven, movable underground vehicle, such as a load-haul-dump machine, headers or dumpers, for example.

Below, the disclosure will be explained by way of example for electric load-haul-dump machines but is not limited thereto.

BACKGROUND

Electric load-haul-dump machines consist of a chassis into which the drive elements are integrated. Usually, load-haul-dump machine have rubber tires and are most frequently equipped with a four-wheel drive. A bucket boom with a loader bucket is mounted on the front frame.

Because of the routes often being narrow, electric load-haul-dump machines are generally equipped with an articulated steering system, which results in a small turning radius. Laterally behind the articulated steering system, the driver's cab is disposed very low rearward of the articulated steering system. The driver's seat is disposed either crosswise to the direction of travel or in a pivotable manner. As a result, the operator is able to see the travel path in the case of both forward and backward motion.

In some mines, semi-automatic or fully automatic electric load-haul-dump machines are used as an alternative, in which the excavated material is collected by remote control by an operator who may be sitting in a control room.

Electric load-haul-dump machines are supplied with electrical energy via a trailing cable with a length of up to 300 m and have an output of up to about 320 kilowatts. The trailing cable is wound up on a cable drum in the rear of the vehicle, with the drive unit of the cable drum being controlled by microprocessors in modern loaders. This is advantageous in that the cable is always optimally wound up. Electric load-haul-dump machines are equipped with an active drum drive unit, for example, which ensures ordered winding, whereby long operating lives of the cable are obtained as a result of smaller tensile forces. The sag of the trailing cable may also be monitored with sensors. If there is a danger, during travel, of driving over the trailing cable due to too much sagging, the loader is immediately immobilized.

Electric load-haul-dump machines, when used underground, are advantageous particularly due to their emission-free drive unit, and are therefore particularly suitable for projects with little fresh air ventilation. Due to the trailing cable, however, electric load-haul-dump machine have only a limited range and are therefore inflexible. In particular, the lack of flexibility is related to the fact that electric load-haul-dump machine cannot be moved without the feed cable. In order to be able to move the electric load-haul-dump machine to a different job site, the trailing cable needs to be disconnected first, and the electric load-haul-dump machine has to be supplied with a voltage by means of a generator.

The power of the electric load-haul-dump machine is also often insufficient because the drive system cannot be supplied with enough power via the trailing cable. The cable cross sections cannot be enlarged to any extent because the range would otherwise be reduced due to the thicker cable on a cable drum system.

SUMMARY

Based on this prior art, the disclosure provides an electrically driven, movable underground vehicle, in particular an electric load-haul-dump machine, with an improved performance and flexibility. The disclosure further provides a method for operating such an underground vehicle which improves the performance and the flexibility.

According to the disclosure, an electrically driven, movable underground vehicle is provided having the features of claim 1 and a method for operating such an underground vehicle with the method steps of patent claim 9.

According to the disclosure, the underground vehicles, hereinafter the electric load-haul-dump machines, have an additional energy storage unit. With respect to its size and power, the latter is dimensioned in such a way that the electric load-haul-dump machine can be moved without an energy feed from the supply network. Thus, a relocation to a new job site of the electric load-haul-dump machine is made considerably easier.

Another advantage is that in the case of great power requirements, the peak energy can be drawn from the energy storage unit.

According to the disclosure, the energy feed via the supply network and the drawing of the peak load from the energy storage unit is not controlled in accordance with a fixed ratio, but controlled by a processor of the switchgear assembly based on environment variables. The ratio of the electrical energy flows from the supply network and the energy storage unit is thus controlled depending on the demands.

For example, the maximum power to be transported via the trailing cable depends on the length of the cable wound on a drum of the electric load-haul-dump machine. Only a smaller amount of power can be transmitted if there is a large amount of cable on the drum. Moreover, the temperature of the cable also plays a role with regard to the maximum power to be transmitted. According to the disclosure, the aforementioned effects can be compensated by an active control and corresponding additional energy input from the energy storage unit. A corresponding software actively controls the ratio between the power from the supply network and the power from the energy storage unit.

According to the disclosure, it may also be provided that the braking process of the electric load-haul-dump machine is monitored and controlled by the software.

During a braking process, kinetic energy has to be removed from the drive system so that the electric load-haul-dump machine is able to come to a standstill. In the process, the kinetic energy is first fed back into the electrical system of the electric load-haul-dump machine via the drive motor, which works as a generator.

If energy requirements from another consumer load should exist at this point in time, the braking energy is used for supplying these consumer loads. If no energy requirements exist, the charging state of the energy storage unit is checked and the energy storage unit is charged if necessary. If more braking energy is present than the energy storage unit is capable of taking up, the energy is actively fed back into the supply network. Only if the supply network is incapable of taking up any braking energy at this point in time does the braking energy have to be converted into thermal energy via brake resistors.

The energy generated during the braking operation is inputted back into the network, phase-synchronously, with a power inverter and an active front end unit. If the intermediate circuit voltage rises to a certain value, the direct voltage in the intermediate circuit is inputted back into the network, amplitude-synchronously and phase-synchronously, by a power inverter. The return feed during generative operation of the motor takes place via a power inverter connected antiparallel to the rectifier. The former operates phase-synchronously with respect to the network. In this case, the phase having the greatest voltage value is detected in the three-phase current network at the time t=0. The energy is now returned to the network phase-synchronously. It is in each case commuted to the next phase if the latter exceeds the first one with respect to the level of the voltage.

Therefore, the control system or software monitors the entire braking process. If no system should be able to actively take up braking energy, the control system activates the mechanical braking system of the electric load-haul-dump machine.

Another factor which, according to the disclosure, is actively taken into account in the energy distribution is the cooling system of the electric load-haul-dump machine. Both the energy storage system and the braking system are subject to temperature threshold values. The temperature affects the performance of the two systems. Thus, an excessive energy storage unit temperature means that the system can output and take up less energy. According to the disclosure, taking into account the entire energy balance, the power parameters of the electric load-haul-dump machine may possibly be reduced in the case of a power output; in the case of energy intake, other consumer loads of the electric load-haul-dump machine take up the energy or convert it into heat.

According to the disclosure, the electrical energy is directly used for a traveling movement of the load-haul-dump machine. In this case, the traveling movement is realized by either one or also by several electric drive units. In this case, the switchgear assembly according to the disclosure with the associated processor and the software according to the disclosure make it possible, on the one hand, that the energy of the energy storage unit can be used for moving the load-haul-dump machine and, on the other hand, that the two energy sources (supply network, energy storage unit) can also be used at the same time in order to absorb power peaks during operation.

Because of the optimized climbing/braking performance, the degree of efficiency of the entire machine is also improved. Moreover, high hydraulic pressures are no longer required because only the steering/work hydraulic system needs to be driven. On the whole the temperature level of the load-haul-dump machine according to the prior art is lower than in prior-art load-haul-dump machines.

In a particularly advantageous embodiment, a cooling system cooling the energy storage unit is provided. This is particularly reasonable if the ambient temperature exceeds 40°.

In a first embodiment, the maximum power of the auxiliary drive unit(s) is about 100 to 150 kW, preferably 130 kW. The maximum power of the auxiliary drive units during travel is 50 to 60 kW. According to the disclosure, the travel speed in the state of being decoupled from the supply network may be about 5 km/h, with the maximum travel distance to be traveled being about 500 m.

BRIEF DESCRIPTION OF THE DRAWINGS

Other advantageous and preferred embodiments, features and properties become apparent from the following special description and with reference to the Figures. The drawing, which only illustrates a single embodiment, shows.

DETAILED DESCRIPTION OF THE DRAWINGS

Figure 1:
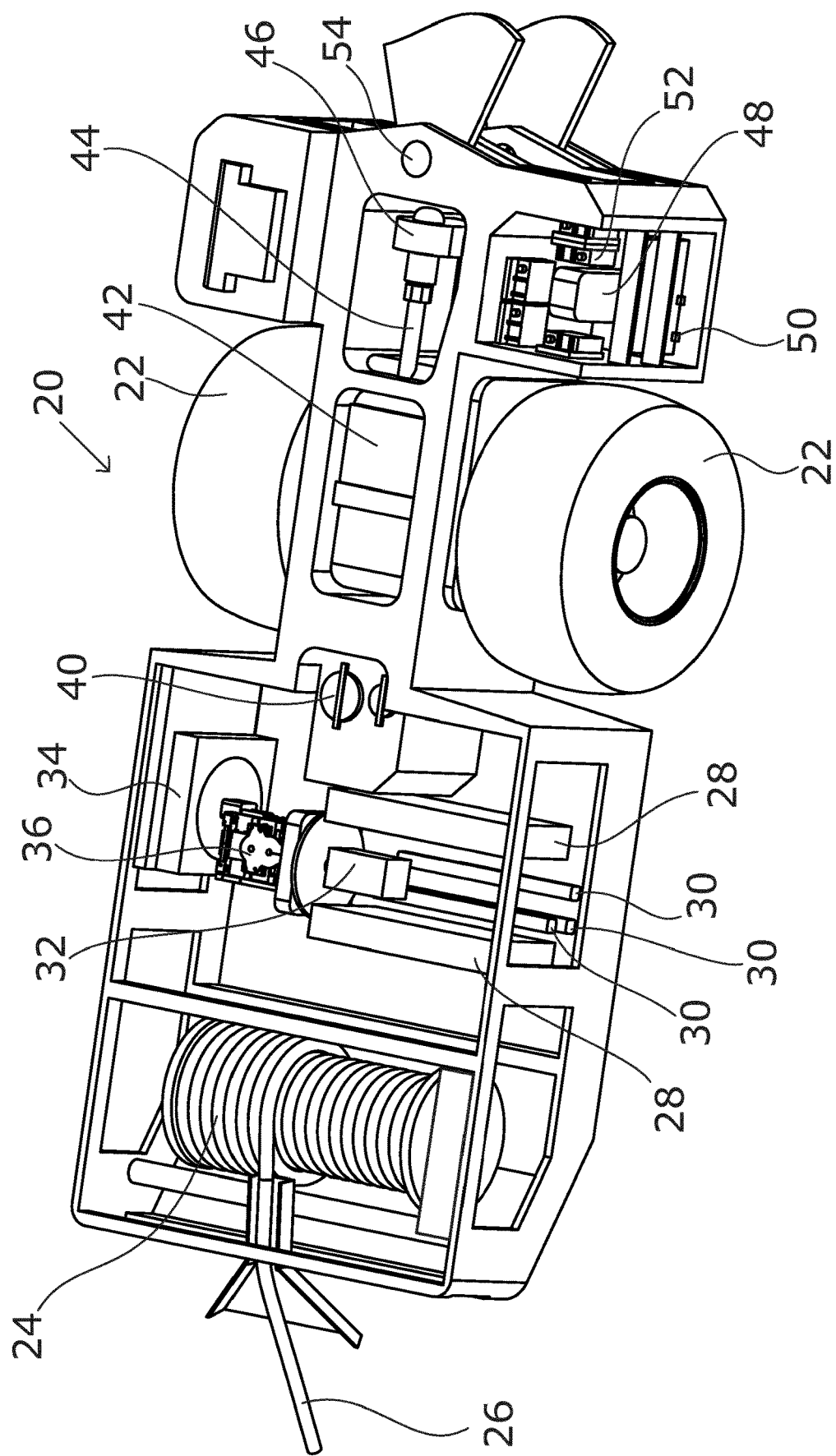
FIG. 1 a perspective view of an exemplary embodiment of a chassis of a load-haul-dump machine according to the disclosure.

FIG. 1 shows a chassis of an underground vehicle according to the disclosure from above. A load-haul-dump machine 20 is shown. Two driven drive wheels 22 can be seen. A cable drum 24 with a trailing cable 26 that can be reeled off is shown in the rear area of the load-haul-dump machine 20. The load-haul-dump machine 20 can be connected to an electrical supply network via the trailing cable 26. Preferably, the cable drum 24 is controlled by microprocessors, whereby the winding and the sagging of the trailing cable 26 are optimized.

Between the cable drum 24 and the drive wheels 22, two energy storage units 28 are arranged, which are disposed crosswise to the direction of travel in the exemplary embodiment shown. Three braking resistors 30, which are also disposed crosswise to the direction of travel, and an auxiliary drive motor 32, a water-cooled radiator 34 and a coupling 36 with pumps are located between them. A hydraulic container 40 for hydraulic liquid is also provided.

A drive motor 42 can be seen between the drive wheels 22. Joint shafts 44 are guided out from the former and connected to a drop box 46. The height difference between the two joint shafts 44 is about 800 mm.

An oil cooler 48, a switchgear assembly 50 (with a transformer 58) and a total of 5 power inverters 52 are arranged in the front region. At the front in the direction of travel, the articulated joint 54 common in load-haul-dump machines 20 is provided at the front face.

Figure 2:
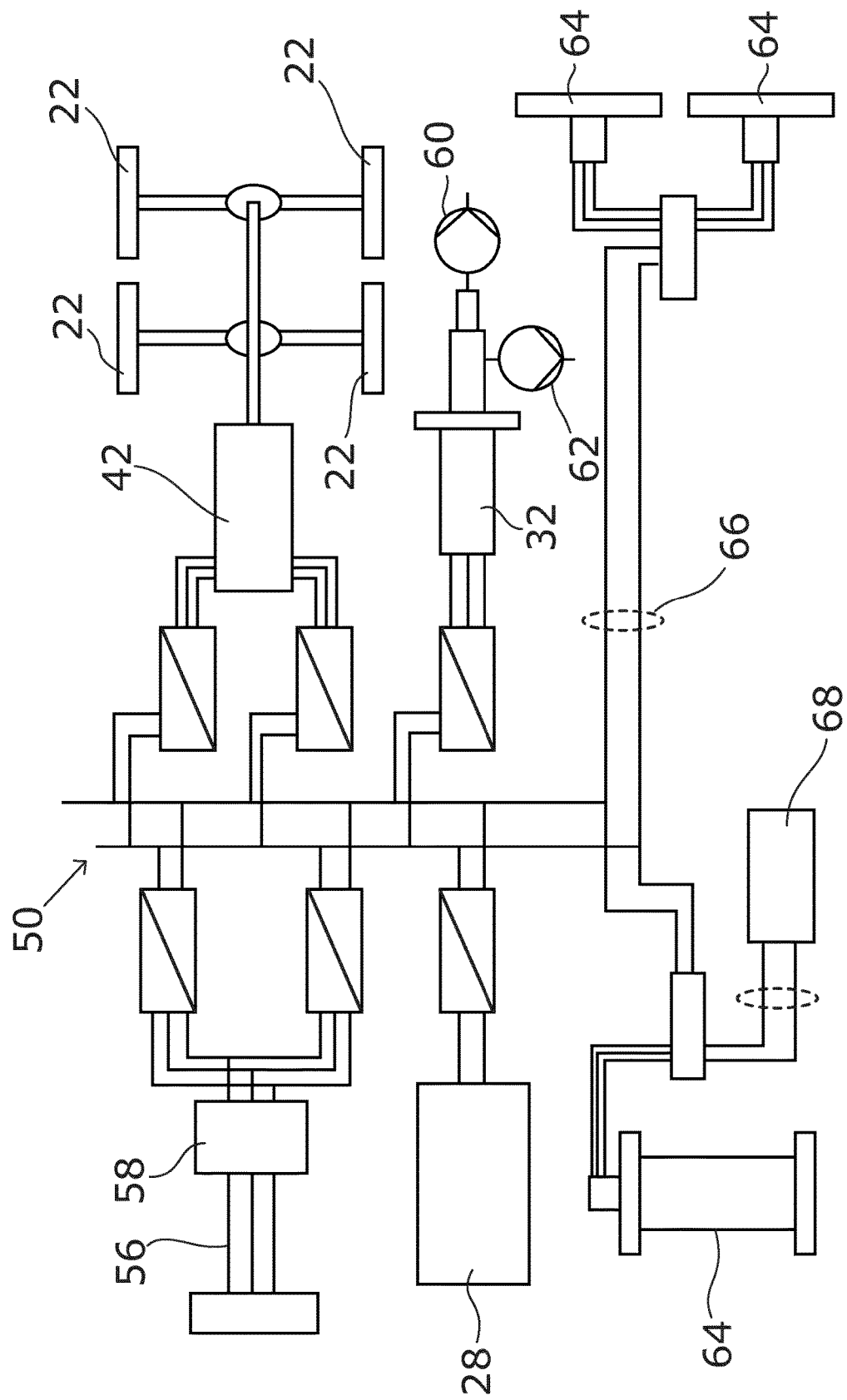
FIG. 2 shows a simplified principle sketch of the system configuration of the load-haul-dump machine according to the disclosure.

FIG. 2 illustrates the system setup of the load-haul-dump machine 20 according to the disclosure. A supply network connection 56 connected to the transformer 58 is shown. The transformer 58 converts the approximately 1000 volts supplied by the supply network to the required voltage. The energy storage unit 28 is shown as a second energy source.

The energy provided by the two energy sources is connected to the drive motor 42 or the auxiliary drive motor 32 via the switchgear assembly 50. In the process, the energy provided by the supply network or the energy storage unit 28 is directly connected to the drive motor 42, that is, while bypassing the auxiliary drive motor 32 or a hydraulic fluid transmission. A common 24-volt battery 68 is also provided.

The auxiliary drive motor 32 is followed by further consumer loads, such as a braking pump 60 and a joint/work pump 62. The system according to the disclosure further has additional asynchronous machines 64 operated by means of a direct current network 66. In the exemplary embodiment shown, the drive motor 42 is configured as a permanently excited synchronous machine, and the auxiliary drive motor 32 as an asynchronous machine 64.

The invention claimed is:
1. An electrically driven, movable underground vehicle, wherein said vehicle is a load-haul-dump machine the underground vehicle comprising:
a chassis with at least two drive wheels,
an electrical trailing cable for connection to an electrical supply network, an electric drive motor electrically connected to the trailing cable, for driving the drive wheels, an energy storage unit, an auxiliary drive motor with a hydraulic fluid transmission, a switchgear assembly and a processor for controlling the supply of the electric drive motor and the electric auxiliary drive motor with electrical energy, wherein the drive motor directly drives the drive wheels while bypassing the hydraulic fluid transmission, the energy provided by the energy storage unit is sufficient for driving the drive wheels and for temporarily moving the load-haul-dump machine independently of the electrical supply network, wherein a braking system is provided having kinetic energy released during the braking process and fed back into the electrical system of the load-haul-dump machine via the drive motor, which works as a generator, in that the processor controls the utilization of the fed-back energy such that the fed-back energy is supplied to the energy storage unit or to consumer loads as required if they have an energy requirement, in that the processor controls the utilization of the fed-back energy such that the fed-back energy is fed into the supply network when the energy storage unit is unable to take up energy and there is no energy requirement of the consumer loads, and in that the processor activates a mechanical braking system when neither the load-haul-dump machine nor the supply network are able to take up fed-back energy.

2. The underground vehicle according to claim 1, wherein the processor of the switchgear assembly controls the ratio of the electrical energy flows from the electrical supply network and the energy storage unit depending on demand.

3. The underground vehicle according to claim 2, wherein the processor of the switchgear assembly controls the electrical energy flows such that, during a peak load requirement, energy of the electrical supply network and energy of the energy storage unit are used at the same time.

4. A method for operating an electrically driven, movable underground vehicle, wherein said vehicle is a load-haul-dump machine, the method including the following steps:

providing a chassis with at least two drive wheels, providing an electrical trailing cable for connection to an electrical supply network, providing an electric drive motor, which is electrically connected to the trailing cable, for driving the drive wheels, providing an energy storage unit having energy for moving the drive wheels and to temporarily move the load-haul-dump machine independently of the supply network, providing an auxiliary drive motor with a hydraulic fluid transmission, providing a switchgear assembly and a processor for controlling the supply of the electric drive motor and the electric auxiliary drive motor with electrical energy, wherein the drive motor directly drives the drive wheels while bypassing the hydraulic fluid transmission, when the electrical supply is affected via the supply network, and alternatively driving the drive wheels by the energy provided by the energy storage unit, wherein a braking system is provided having kinetic energy released during the braking process and fed back into the electrical system of the load-haul-dump machine via the drive motor, which works as a generator, in that the processor controls the utilization of the fed-back energy such that the fed-back energy is supplied to the energy storage unit or to consumer loads as required if they have an energy requirement, in that the processor controls the utilization of the fed-back energy such that the fed-back energy is fed into the supply network when the energy storage unit is unable to take up energy and there is no energy requirement of the consumer loads, and in that the processor activates a mechanical braking system when neither the load-haul-dump machine nor the supply network are able to take up fed-back energy.

5. The method according to claim 4, wherein the processor of the switchgear assembly controls the ratio of the electrical energy flows of the supply network and the energy storage unit depending on demands.

6. The method according to claim 5, wherein the processor of the switchgear assembly controls the electrical energy flows such that, in a peak load requirement, energy of the supply network and energy of the energy storage unit are used at the same time.

* * * * *